F. W. KING.
GOGGLES.
APPLICATION FILED AUG. 10, 1916.
1,223,076.
Patented Apr. 17, 1917.
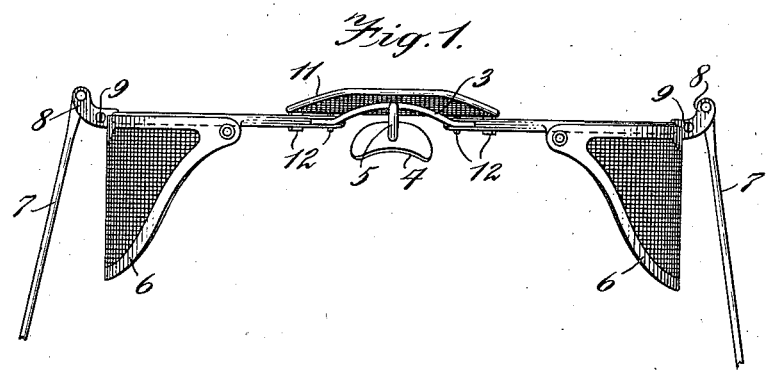
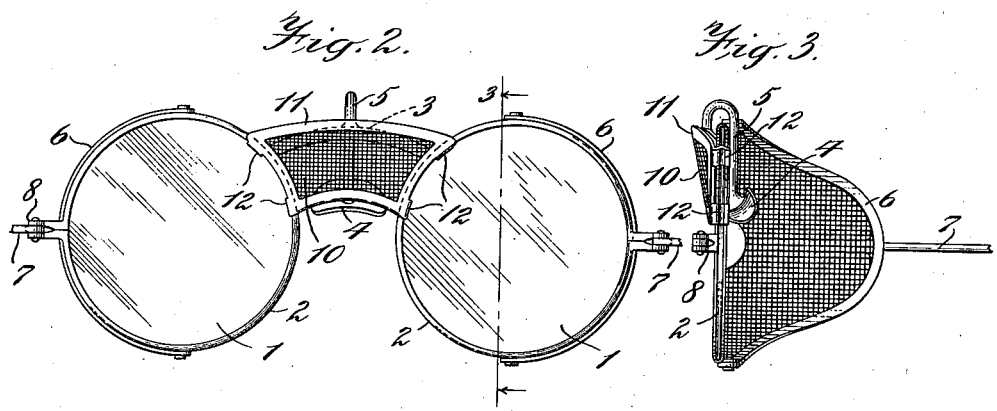
Inventor
Frederick W. King,
By his Attorneys
Rosenbaum, Stockbridge & Kiret.

UNITED STATES PATENT OFFICE.

FREDERICK W. KING, OF NEW YORK, N. Y., ASSIGNOR TO JULIUS KING OPTICAL CO., A CORPORATION OF NEW YORK.

GOGGLES.

1,223,076.  Specification of Letters Patent.  Patented Apr. 17, 1917.

Application filed August 10, 1916. Serial No. 114,164.

*To all whom it may concern:*

Be it known that I, FREDERICK W. KING, a citizen of the United States, residing at the city of New York, in the borough of Manhattan and State of New York, have invented certain new and useful Improvements in Goggles, of which the following is a full, clear, and exact description.

My invention relates to spectacles or goggles, and has for an object the provision of suitable means for protecting the eyes of the wearer against the entrance of foreign particles between the lenses. A more specific object is to provide means for this purpose which can be easily, quickly and conveniently attached to or removed from the goggle. Another object is to provide means for such attachment which will positively and securely hold the protecting means in place and which will not alter the finished appearance of the goggle when the protecting means are removed. Other objects are neatness of appearance and inexpensiveness of construction. Still other objects and advantages of my invention will appear from the following description.

My invention comprehends a shield member shaped to fit the upper portion of the space between the lenses of the goggle, and provided at each end with an outstanding lug or finger which is clamped between the respective lens and rim. More specifically the shield is composed of wire gauze, the edge of which is bound with a narrow strip of sheet metal, integral lugs or fingers being struck out from the portion of the binding for the ends of the shield.

My invention comprehends other features of construction which will more particularly appear in the following description.

I shall now describe the embodiment of my invention illustrated in the accompanying drawings and shall thereafter point out my invention in claims.

Figure 1 is a plan view of a goggle embodying my invention;

Fig. 2 is a front elevation of the same; and

Fig. 3 is a vertical section taken on line 3—3 of Fig. 2, looking in the direction of the arrows.

In general construction, the goggle illustrated in the drawings is like that of my co-pending application Serial No. 848,303, filed June 30, 1914. The lenses 1 are mounted in suitable rims or eye-wires 2 which are connected by a bridge member 3 consisting of a narrow flexible strip integrally secured to the eye-wires at its ends, and extending between the lenses well above their center lines. The nose piece 4 is disposed between the lenses some distance below the bridge member 3, and is attached thereto by a flexible post 5 which extends upwardly some distance above the bridge member and thence turns downwardly and joins the upper edge of the bridge member, the looped portion of the post being thereby disposed above the line of vision.

Outside shields 6 pivoted to the respective eye-wires are also provided, as described in my said co-pending application, as well as suitable temples 7 which are pivoted to the end pieces 8 of the eye-wires, through which the clamping screws 9 pass in the usual manner. As described in my said co-pending application, these end pieces are reversed from the ordinary construction of spectacles so as to permit the temples to be folded forwardly across the front of the lenses, in order that the goggle may be compactly folded.

The shield or protector which forms the subject matter of this invention has a woven wire body portion 10, the entire edge of which is bound by a suitable sheet metal binder 11. This shield or protector is disposed in the upper portion of the space between the lenses and has its ends concaved so as to conform to the curvature of the lenses. At each end of the shield member the binding strip has two integral lugs or fingers 12 struck out therefrom, these lugs or fingers extending rearwardly at substantially right angles to the shield member.

The shield member is secured in place by clamping these lugs or fingers between the respective eye-wire 2 and lens 1. The shield member is arranged in front of the bridge member 3 and the lugs or fingers 12 which extend rearwardly therefrom are bent slightly to U-shape, in order to fit into the channel on the inside of the eye-wire.

In order to attach the shield member, it is only necessary to release the clamping screws 9 sufficiently to permit the insertion of the lugs or fingers 12, after which the clamping screws are again tightened. It will thus be seen that no screws or other auxiliary parts are needed for attaching the shield member and that it is readily and easily removable without affecting the finished appearance of the goggle.

It is obvious that various modifications may be made in the construction shown in the drawings and above particularly described within the principle and scope of my invention.

I claim:

1. In a spectacle construction, in combination with a pair of lenses and eye-wires forming rims therefor, a shield member extending between the lenses and detachably connected at its ends to the eye-wires.

2. In a spectacle construction, in combination with a pair of lenses and eye-wires forming rims therefor, a shield member extending between the lenses and including an outstanding lug or finger at each end thereof, the lugs or fingers being clamped between the respective lenses and eye-wires.

3. In a spectacle construction, in combination with a pair of lenses and eye-wires forming rims therefor, a shield member extending between the lenses and composed of woven wire gauze and a sheet metal binding therefor, the binding including at each end one or more integral outstanding lugs or fingers clamped between the respective lenses and eye-wires.

In witness whereof, I subscribe my signature, in the presence of two witnesses.

FREDERICK W. KING.

Witnesses:
 WALDO M. CHAPIN,
 WM. M. STOCKBRIDGE.